J. B. RICHARDSON & T. W. MEICH.
RAILWAY BOND WIRES.
APPLICATION FILED AUG. 17, 1910.
981,309.
Patented Jan. 10, 1911.
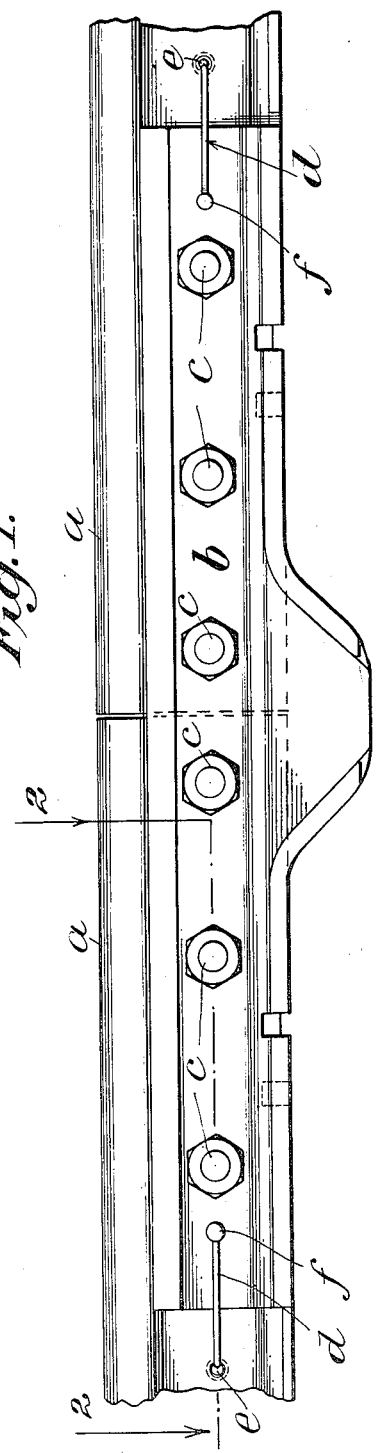
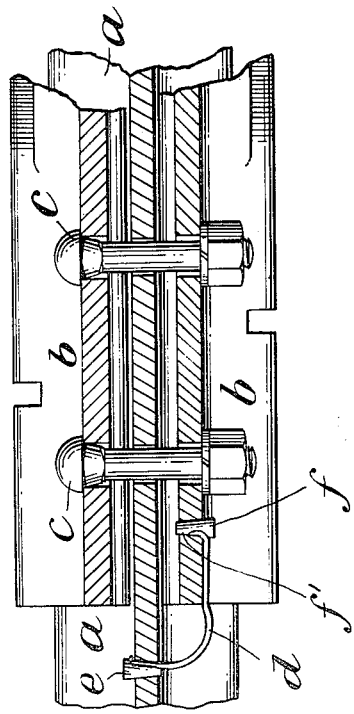
Attest:
Inventors:
John B. Richardson and
Thomas W. Meich
by Redding, Greeley & Austin
Attys.

UNITED STATES PATENT OFFICE.

JOHN B. RICHARDSON AND THOMAS W. MEICH, OF SOMERVILLE, NEW JERSEY.

RAILWAY BOND-WIRES.

981,309.  Specification of Letters Patent.  Patented Jan. 10, 1911.

Application filed August 17, 1910. Serial No. 577,693.

*To all whom it may concern:*

Be it known that we, JOHN B. RICHARDSON and THOMAS W. MEICH, citizens of the United States, residing in Somerville, New Jersey, have invented certain new and useful Improvements in Railway Bond-Wires, of which the following is a specification, reference being had to the accompanying drawings, forming a part hereof.

In railway signaling systems in which the electrical continuity of one of the rails is an essential feature, it is usual to insure such electrical continuity from rail to rail by a bond wire which is secured at its ends to adjacent rails, with good electrical contact, so as to bridge the joint between the rails. Usually the bond wire is secured to each rail beyond the adjacent end of the fish plate by which the rails are connected mechanically. One evil result of this arrangement is that it becomes possible thereby to remove the fish plate without breaking the electrical continuity of the rail, so that the signal system might show safety when the rails are separated. Another evil result is that the portion of each of the rails which is covered by the fish plate, which is the weakest portion of the rail, might be broken without breaking the electrical continuity of the rail, and in this way also the signal system might show safety when one of the rails is broken at its end. Attempts have been made to meet the former difficulty by threading the bond wire back and forth through the holes drilled in the fish plate and in the web of the rail but this not only adds undesirable expense but further weakens the rail.

It is the object of this invention to provide for such bonding of the rails as shall prevent entirely the possibility either of the removal or breakage of the fish plate or of the breakage of either rail end within the ends of the fish plate without breaking the electrical continuity of the rails and so setting the signals at danger. In accordance with this invention two short bond wires are used, one at each end of the fish plate, each bond wire being secured with good electrical contact to the corresponding rail and the adjacent end of the fish plate. It is therefore impossible for the fish plate to be removed or for either rail end within the fish plate to be broken without breaking the electrical continuity of the rail, it being inevitable that the fish plate itself would be broken if the rail end covered by it is broken.

The invention will be more fully explained hereinafter with reference to the accompanying drawing in which it is illustrated and in which—

Figure 1 is a view in side elevation showing two rail ends with the fish plate by which they are connected and the bond wires applied thereto. Fig. 2 is a detail view in horizontal section through a portion of the web of one of the rails and of the fish plates. Fig. 3 is a detail view in perspective of one of the improved bond wires.

The rails $a$, $a$ and the fish plates $b$ may be of any usual or suitable form and may be secured together by bolts $c$, $c$ in the usual or in any convenient manner. The fish plate $b$ on one side is made a part of the electrical circuit of rails and to this end an electrical connection from each rail to the fish plate is established from a point in the rail beyond the end of the fish plate to the adjacent end of the fish plate by a bond wire $d$. This bond wire may be secured to the rail in any convenient manner, as by means of a tapered pin $e$ driven into a corresponding hole in the web of the rail, from the opposite side of the web. This is impracticable as a means for securing the other end of the bond wire to the adjacent end of the fish plate, since the pin cannot be driven into the hole in the fish plate from the side opposite the bond wire. Therefore, it is desirable to provide each bond wire with a tapered pin $f$ brazed or otherwise secured thereto in permanent electrical connection so that such pin may be driven into the corresponding hole $f'$ formed therefor in the fish plate.

It will be seen at once that by providing two bond wires for each fish plate on one side, one at each end thereof, it is impossible to remove the fish plate without breaking the electrical continuity of the rails and that as it is practically impossible that either rail within the space covered by the fish plate, should break without breaking the fish plate, it is impossible for any breakage of either rail within the space covered by the fish plate to take place without breaking the electrical continuity of the rails and so setting the signals at "danger."

We claim as our invention:

The combination with adjacent rails and a fish plate connecting the same mechanically of two bond wires, one applied at each
5 end of the fish plate and connected electrically to the fish plate near its end and to the rail beyond the end of the fish plate.

This specification signed and witnessed this fifteenth day of August A. D. 1910.

JOHN B. RICHARDSON.
THOMAS W. MEICH.

Signed in the presence of—
JOSHUA DOUGHTY, Jr.,
ARTHUR P. SUTPHEN.